J. F. O'CONNOR.
PRESSURE GAGE.
APPLICATION FILED APR. 11, 1914.

1,175,979.

Patented Mar. 21, 1916.

2 SHEETS—SHEET 1.

WITNESSES:

INVENTOR.
John F. O'Connor
BY
HIS ATTORNEY

J. F. O'CONNOR.
PRESSURE GAGE.
APPLICATION FILED APR. 11, 1914.

1,175,979.

Patented Mar. 21, 1916.
2 SHEETS—SHEET 2.

WITNESSES:

INVENTOR.
John F. O'Connor
BY
HIS ATTORNEY

UNITED STATES PATENT OFFICE.

JOHN F. O'CONNOR, OF CHICAGO, ILLINOIS, ASSIGNOR TO WILLIAM H. MINER, OF CHICAGO, ILLINOIS.

PRESSURE-GAGE.

1,175,979.              Specification of Letters Patent.     Patented Mar. 21, 1916.

Application filed April 11, 1914. Serial No. 831,283.

*To all whom it may concern:*

Be it known that I, JOHN F. O'CONNOR, a citizen of the United States, residing at Chicago, in the county of Cook and State of Illinois, have invented a certain new and useful Improvement in Pressure-Gages, of which the following is a full, clear, concise, and exact description, reference being had to the accompanying drawings, forming a part of this specification.

My invention relates to improvements in machines for testing the operation of side bearings for railway cars.

The object of my invention is to provide a railway car side-bearing testing machine in which differences in pressure may be readily ascertained.

Figure 1:
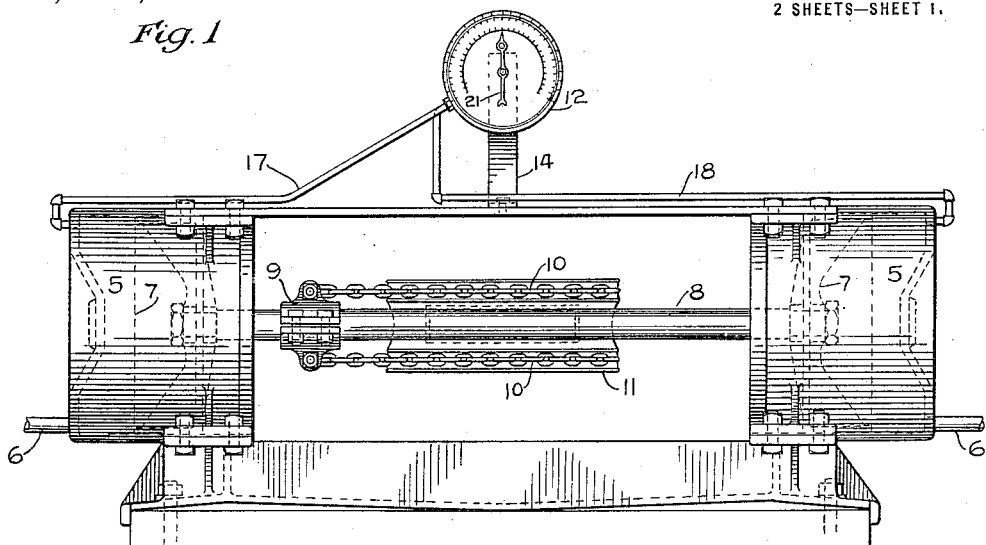
Figure 2:
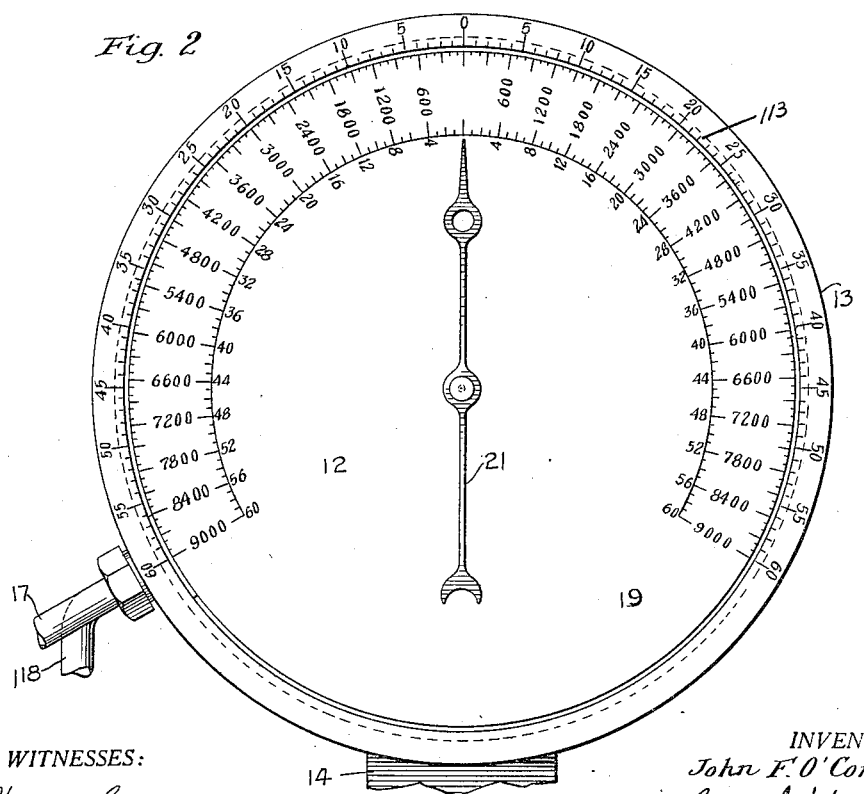
Figure 3:
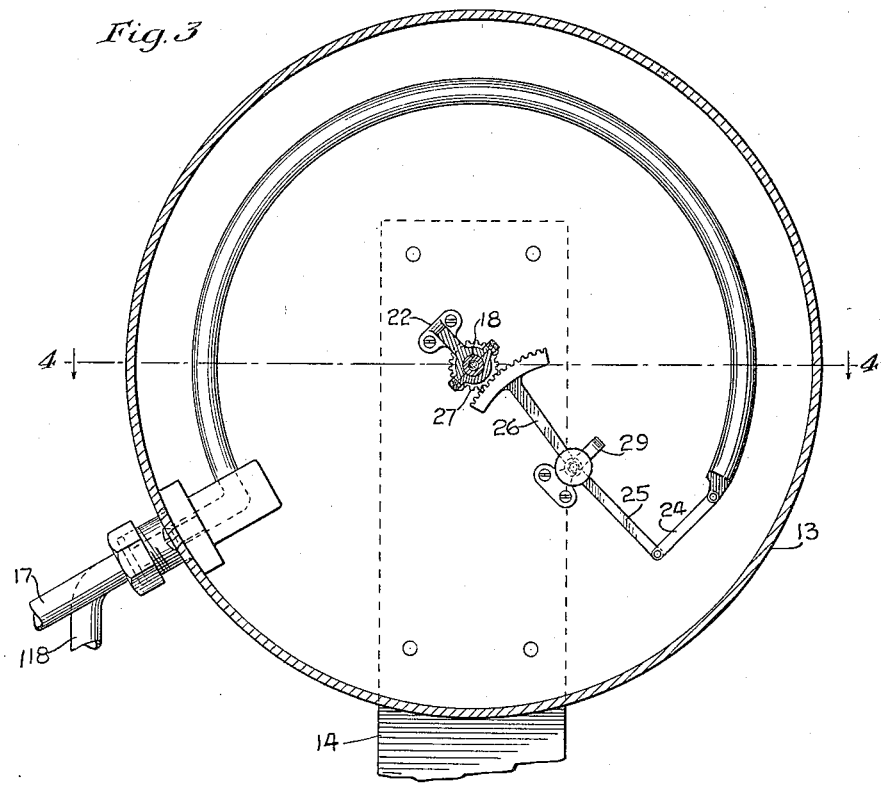
Figure 4:
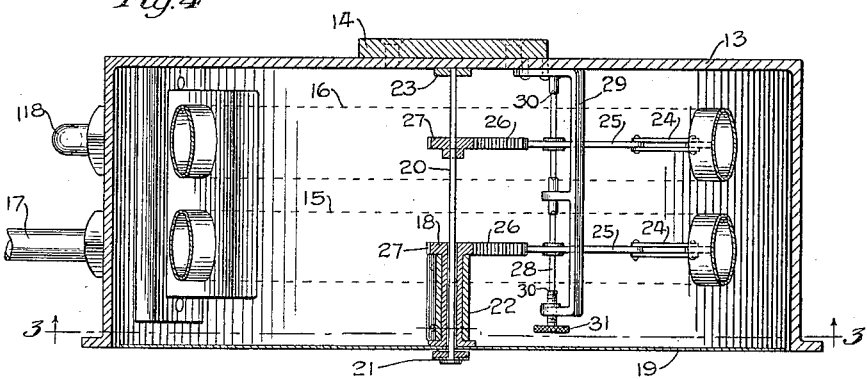

In the drawings forming a part of this specification, Figure 1 is a front elevation of a machine embodying my invention. Fig. 2 is a plan view of the dial used in connection therewith. Fig. 3 is a detail transverse section on line 3—3 of Fig. 4. Fig. 4 is a detail horizontal section on line 4—4 of Fig. 3.

Referring to the drawings, the numerals 5—5 represent hydraulic cylinders, each having connection with a water supply pipe by means of a suitable connecting pipe 6. The pistons 7—7 of the hydraulic cylinders are connected by a stem 8, which is furnished with a coupling clamp 9 adapted to be rigidly secured to said stem, to which is secured the chains 10—10, which chains with the head 11 are adapted to operatively connect the stem 8 with an oscillating bar of a railway car side bearing testing machine, said bar not being shown in the drawings, and which is adapted to carry side bearings, or other similar bearings to be tested. It will be understood that in this type of railway car side bearing testing machine, the side bearings to be tested are secured to a member connected with the stem 8, preferably by means of the chains 10 in the head 11, and that a load or pressure is applied to the bearings in the manner that the weight of a car is applied to the same in actual service; that one of the cylinders is opened to permit the slow discharge of water therefrom, and that the other cylinder under the head or pressure of water conveyed thereto through the supply pipe will force the piston inwardly in the cylinder, and that the difference between the pressure in one cylinder and the pressure in the other cylinder is indicated by pressure gages connected to the cylinders. Heretofore a pressure gage has been employed for each cylinder, and in the operation of the testing machine it has been necessary to read first one gage and then the other, and determine the difference in pressures in the two cylinders as shown by the gages, in order to determine the amount of force required to overcome the frictional resistance of the side bearings being tested upon the member to which they are attached. In my invention the gages are combined into one gage 12, arranged, as hereinafter described, to permit the ready reading of the difference in pressures in the two cylinders.

The pressure gage 12 comprises a casing 13, suitably mounted upon a supporting member as the plate 14, the said casing having therein a pair of pressure gage tubes 15 and 16, one of said tubes being connected to one cylinder by a pipe 17, and the other of said tubes to the other cylinder by a pipe 118. The tube 15 is operatively connected to a hollow shaft 18, upon which is mounted a movable dial 19. The other pressure gage tube 16 is operatively connected with a shaft 20 passing through the hollow shaft 18, a needle 21 being mounted upon the outer end of said shaft. The hollow shaft 18 revolves in a suitable bearing or mounting 22. The shaft 20 bears within the hollow shaft 18 near one end, and is journaled at the other end, as indicated at the numeral 23 in Fig. 4 of the drawings, in the casing or stationary dial 13. The pressure gage tubes are each operatively connected to the shaft 20 and the shaft 18, respectively, by means of a jointed connecting member comprising the links 24—24, the bars 25—25, the quadrants 26—26, and the pinions 27—27, with which the shafts 18 and 20, respectively, are provided, the said pinions intermeshing each with its adjacent quadrant 26. Each of the bars 25 is mounted upon a short shaft 28, the shafts 28 being alined and mounted in a substantially U-shaped arm or bracket 29 secured to the casing 13, the arm 39 being provided with upper and lower needle bearings 30—30 coöperating with the upper end of one short shaft 28 and the lower end of the other and the lower bearing 30 being preferably adjustable by means of a screw 31. The meeting ends of the shafts 28 are confined or centered by means of an intermediate integral bracket formed on the U-shaped arm 29, see Fig. 4. The casing 13 is provided on its face with graduated marks forming a stationary dial 113 illustrated in Fig. 2 of the drawings. A movable dial 19 is provided with graduated marks to be read in connection with the stationary dial and in relation to the needle 21. Upon equality of pressure in the two cylinders, both the movable dial and the needle will be in the same relative position. As indicated in Fig. 2, both the movable dial and the needle are at zero. Upon hydraulic pressure within both cylinders, the movable dial and needle will move together so long as the pressure in both cylinders remains the same. Upon a difference in the pressure within the cylinders, not only can the reading of the movable dial from the zero mark on the stationary dial, and the reading of the needle from the zero mark on the stationary dial be readily ascertained, but the difference in position of the needle and of the movable dial may be readily ascertained. Thus the difference of pressures in the two cylinders can be determined at a glance at the one dial face, and the readings readily ascertained even with constantly varying differences of pressure.

I claim:

1. A pressure gage comprising a stationary dial, a movable dial adjacent the stationary dial, a needle, a pair of pressure tubes, one connected with the movable dial and the other connected with the needle, means for making said connections, including a pair of jointed connecting members, and shafts having needle bearings to which said jointed members are secured.

2. In a pressure gage, in combination, a movable dial, a shaft therefor, a needle, a shaft therefor, a pair of pressure tubes, a shaft, link mechanism connected to the last named shaft and engaging one of said pressure tubes at one end, and the shaft for the needle at its other end, and link mechanism mounted on another shaft and connected to the other pressure tube at one end, and to the shaft of the movable dial at the other end.

3. A pressure gage of the character described including, in combination: a movable dial; a movable indicator coöperable with said dial; a pair of independently operated pressure tubes; means including a link interposed between one of said tubes and the movable dial for positively operating the latter in accordance with both increases and decreases of pressure in said tube; and means including a lever interposed between the other tube and the movable indicator for positively operating the latter in accordance with both increases and decreases of pressure in the last named tube.

4. In a pressure gage, in combination, a stationary dial, a movable dial associated therewith, a shaft for operating the movable dial, a needle associated with the movable dial, a shaft upon which said needle is mounted and by which it is moved, a pair of pressure tubes, one of said tubes having a jointed connection with the shaft for the movable dial, the other of said pressure tubes having a jointed connection with the shaft for the needle.

JOHN F. O'CONNOR.

Witnesses:
 ELIZABETH BRITT,
 CARRIE G. RANZ.

Copies of this patent may be obtained for five cents each, by addressing the "Commissioner of Patents, Washington, D. C."